United States Patent
Chen et al.

(10) Patent No.: US 10,365,754 B2
(45) Date of Patent: Jul. 30, 2019

(54) DISPLAY PANEL, DISPLAY DEVICE AND DRIVING METHOD

(71) Applicants:Xiamen Tianma Micro-electronics Co., Ltd., Xiamen (CN); Tianma Micro-electronics Co., Ltd., Shenzhen (CN)

(72) Inventors: Zhonghuai Chen, Xiamen (CN); Ying Sun, Xiamen (CN); Yumin Xu, Xiamen (CN); Poping Shen, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 136 days.

(21) Appl. No.: 15/397,290

(22) Filed: Jan. 3, 2017

(65) Prior Publication Data

US 2017/0115813 A1    Apr. 27, 2017

(30) Foreign Application Priority Data

Aug. 9, 2016   (CN) .......................... 2016 1 0648333

(51) Int. Cl.
  *G06F 3/041*   (2006.01)
  *G06F 3/044*   (2006.01)
(52) U.S. Cl.
  CPC ............ *G06F 3/0416* (2013.01); *G06F 3/044* (2013.01); *G06F 3/0412* (2013.01);
  (Continued)

(58) Field of Classification Search
  CPC . G06F 2203/04105; G06F 2203/04111; G06F 2203/04112
  See application file for complete search history.

(56) References Cited

U.S. PATENT DOCUMENTS 9,360,981 B2 * 6/2016 Hwang ................. G06F 3/0412
2016/0357331 A1 * 12/2016 Kano ...................... G06F 3/044
(Continued)

FOREIGN PATENT DOCUMENTS

CN       205068346 U     3/2016
WO    WO-2015156196 A1 * 10/2015 ............. G06F 3/044

*Primary Examiner* — Kent W Chang
*Assistant Examiner* — Nathaniel P Brittingham
(74) *Attorney, Agent, or Firm* — Anova Law Group, PLLC

(57) ABSTRACT

A display panel, a display device and a driving method are provided. The display panel comprises a touch control driving electrode array including a plurality of touch control driving electrodes; a touch control sensing electrode array including a plurality of touch control sensing electrodes; a force sensing electrode array disposed in a same layer as the touch control sensing electrode array; and at least one force sensing reference electrode. An orthogonal projection of a touch control sensing electrode onto the touch control driving electrode array is at least partially overlapped with the touch control driving electrodes. The force sensing electrode array includes a plurality of force sensing electrodes electrically insulated from the touch control sensing electrodes. An orthogonal projection of the at least one force sensing reference electrode onto the force sensing electrode array is at least partially overlapped with the force sensing electrodes.

18 Claims, 17 Drawing Sheets

(52) U.S. Cl.
CPC .............. *G06F 2203/04105* (2013.01); *G06F 2203/04111* (2013.01); *G06F 2203/04112* (2013.01)

(56) References Cited

U.S. PATENT DOCUMENTS

| | | | |
|---|---|---|---|
| 2017/0010719 A1* | 1/2017 | Chen | G06F 3/044 |
| 2017/0045992 A1* | 2/2017 | Lee | G06F 3/0416 |
| 2017/0052616 A1* | 2/2017 | Lin | G06F 3/044 |
| 2017/0068368 A1* | 3/2017 | Hsiao | G06F 3/0416 |
| 2017/0075493 A1* | 3/2017 | Lee | G06F 3/0418 |
| 2017/0115768 A1* | 4/2017 | Shih | G06F 3/044 |
| 2017/0115812 A1* | 4/2017 | Lin | G06F 3/0416 |
| 2017/0115813 A1* | 4/2017 | Chen | G06F 3/0416 |
| 2017/0220184 A1* | 8/2017 | Liu | G06F 3/0412 |
| 2017/0235414 A1* | 8/2017 | Ding | G06F 3/047 345/174 |
| 2017/0249044 A1* | 8/2017 | Liu | G06F 3/0416 |
| 2017/0285832 A1* | 10/2017 | Lee | G06F 3/0414 |
| 2017/0315657 A1* | 11/2017 | Lai | G06F 3/0412 |

\* cited by examiner

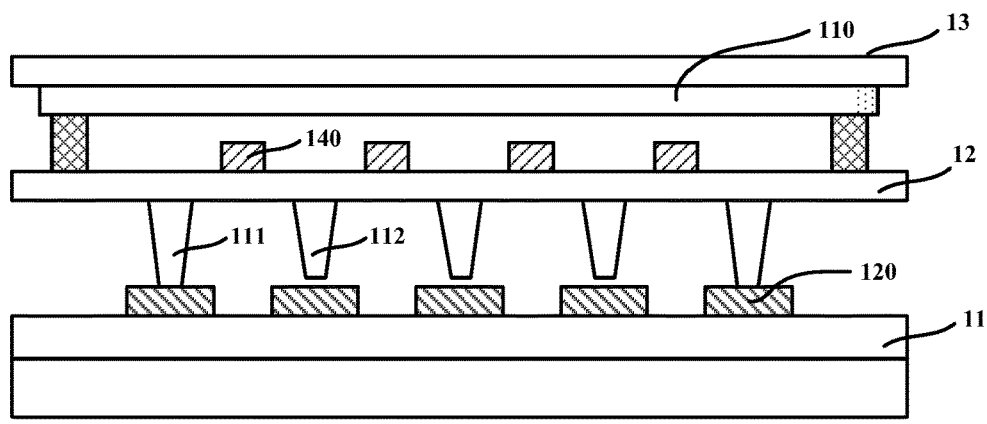
FIG. 1B (1)
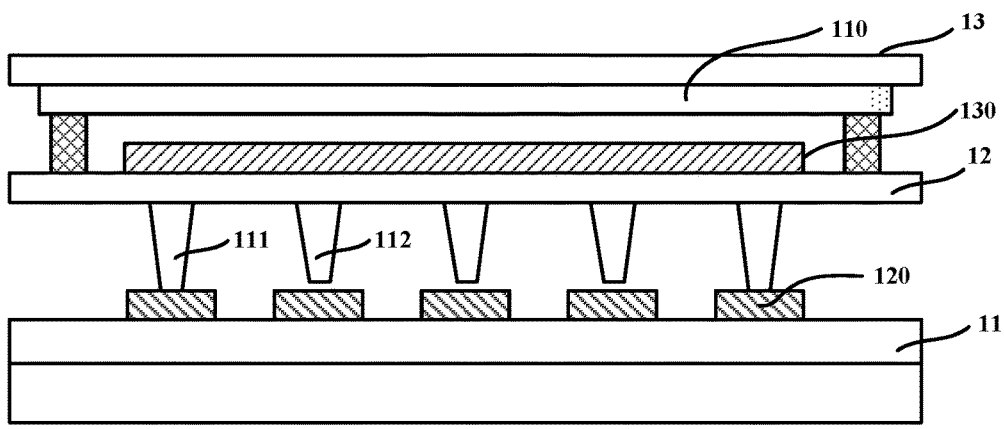
FIG. 1B (2)

DISPLAY PANEL, DISPLAY DEVICE AND DRIVING METHOD

CROSS-REFERENCES TO RELATED APPLICATIONS

This application claims priority of Chinese Patent Application No. 201610648333.4, filed on Aug. 9, 2016, the entire contents of which are hereby incorporated by reference.

BACKGROUND

Touch control display devices are able to detect the coordinates of a touch position on a screen by a finger, stylus, or other object, and to display corresponding information according to the detected coordinates.

However, the development of display technology and the diversity of human-machine interface set higher demand for the touch control display devices. For example, in addition to detecting the coordinates of the touch position on the screen by the finger, an external force perpendicularly applied onto the screen by the finger is also required to be detected and calculated, and corresponding information can be displayed based on the value of the detected force, i.e., realizing a force touch in the touch control display devices.

In existing technologies, to detect the external force applied to the screen, an extra electrode layer is often introduced into current touch control display devices. However, the extra electrode layer may increase the steps in the fabrication process, such that the manufacturing yield may be reduced. Moreover, the extra electrode layer may also increase the thickness of the touch control display devices, which is not in accordance with the trend of the lighter and thinner touch control display devices.

The disclosed display panel, display device and driving method thereof are directed to solve one or more problems set forth above and other problems.

BRIEF SUMMARY OF THE DISCLOSURE

One aspect of the present disclosure provides a display panel. The display panel comprises a touch control driving electrode array including a plurality of touch control driving electrodes extending in a first direction and arranged in a second direction; a touch control sensing electrode array including a plurality of touch control sensing electrodes extending in the second direction and arranged in the first direction; a force sensing electrode array disposed in a same layer as the touch control sensing electrode array; and at least one force sensing reference electrode. An orthogonal projection of a touch control sensing electrode onto the touch control driving electrode array is at least partially overlapped with the touch control driving electrodes. The force sensing electrode array includes a plurality of force sensing electrodes electrically insulated from the touch control sensing electrodes. An orthogonal projection of the at least one force sensing reference electrode onto the force sensing electrode array is at least partially overlapped with the force sensing electrodes.

Another aspect of the present disclosure provides a display device including the display panel.

Another aspect of the present disclosure provides a driving method for the display panel. The driving method comprises: in a touch detection stage, providing a touch control driving signal to the touch control driving electrodes, and receiving a touch control sensing signal from at least either of the touch control sensing electrodes and the force sensing electrodes; in a force detection stage, providing a force driving signal to the force sensing electrodes, receiving a force sensing signal from the force sensing electrodes, and providing a force reference signal to the force sensing reference electrode; and in a display stage, providing a common voltage signal is provided to the touch control driving electrodes.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1B (1) and FIG. 1B (2) illustrates an A-A' and D-D' sectional view of an exemplary display panel in FIG. 1A consistent with disclosed embodiments, respectively;

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

Figure 1A:
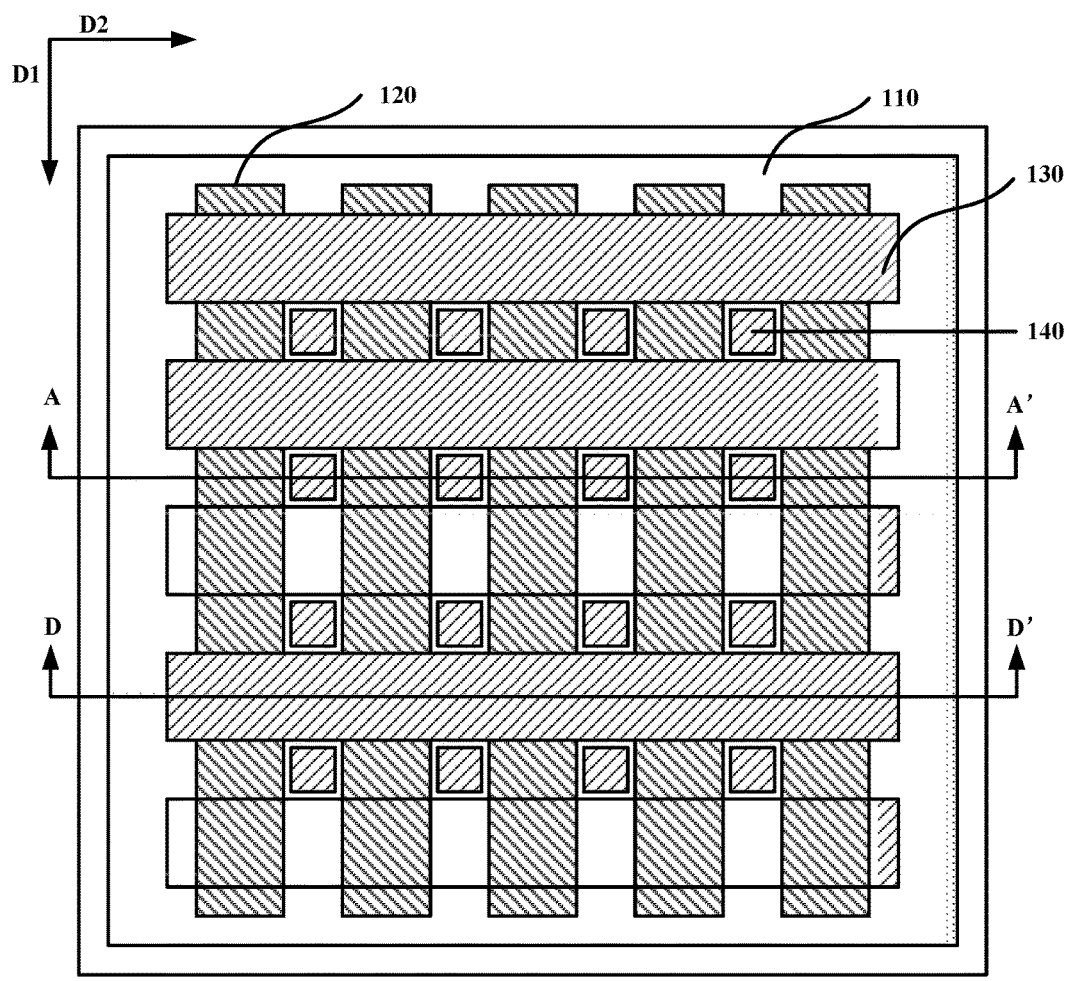
FIG. 1A illustrates an exemplary arrangement of touch control driving electrodes, touch control sensing electrodes, force sensing electrodes, and force sensing reference electrodes in an exemplary display panel consistent with disclosed embodiments.

FIG. 1A illustrates an exemplary arrangement of touch control driving electrodes, touch control sensing electrodes, force sensing electrodes, and force sensing reference electrodes in an exemplary display panel consistent with disclosed embodiments. FIG. 1B (1) and FIG. 1B (2) illustrates an A-A' and D-D' sectional view of an exemplary display panel in FIG. 1A consistent with disclosed embodiments, respectively. The disclosed display panel will be illustrated in the accompanying FIG. 1A and FIG. 1B.

As shown in FIG. 1A, the display panel may include a touch control driving electrode array including a plurality of touch control driving electrodes 120, a touch control sensing electrode array including a plurality of touch control sensing electrodes 130, a force sensing electrode array including a plurality of force sensing electrodes 140, and at least one force sensing reference electrode 110. Other components may also be included.

In particular, the plurality of touch control driving electrodes 120 may extend in a first direction D1 and may be arranged in a second direction D2. The plurality of touch control sensing electrodes 130 may extend in the second direction D2 and may be arranged in the first direction D1. The touch control sensing electrodes 130 may intersect or cross the touch control driving electrodes 120, in which an orthogonal projection of each touch control sensing electrode 130 onto the touch control driving electrode array may be at least partially overlapped with each touch control driving electrode 120.

Thus, each touch control driving electrode 120 may intersect each touch control sensing electrode 130 to form a plurality of intersections, and a plurality of capacitors may be formed in the intersections between the touch control driving electrodes 120 and the touch control sensing electrodes 130. When being pressed or tapped by a finger, the touch control display panel may be able to identify a corresponding touch position through detecting the position of the capacitor having a capacitance change.

Further, the force sensing electrode array and the touch control sensing electrode array may be disposed in a same layer. The force sensing electrodes 140 may be electrically insulated from the touch control sensing electrodes 130. An orthogonal projection of the force sensing reference electrode 110 onto the force sensing electrode array may be at least partially overlapped with each force sensing electrode 140. Thus, the force sensing reference electrode 110 and the force sensing electrode 140 may be adopted as two plates of the capacitor for detecting the magnitude of an external force applied onto the touch control display panel, i.e., for realizing force touch.

In operation, when an external force is applied onto the display panel, the space or the distance between the force sensing reference electrode 110 and the force sensing electrode 140 may vary, leading to a capacitance change in the capacitor formed between the force sensing reference electrode 110 and the force sensing electrode 140. Through detecting the number of the capacitance change, the magnitude of the applied external force may be determined, according to which a specific action or contextually specific control may be performed.

As discussed above, in the disclosed embodiments, the force sensing electrode array and the touch control sensing electrode array may be disposed in the same layer, such that the force sensing electrode array and the touch control sensing electrode array may be fabricated in a same fabrication step. The fabrication procedure of the display panel may be simplified, and the manufacturing yield may be improved. In addition, the thickness of the display panel may be reduced, which may be in line with the development trend of thinner and lighter display panels.

The disclosed display panel may be a liquid crystal display (LCD) panel, an organic light-emitting diode (OLED) display panel, a plasma display panel (PDP), a field emission display (FED) panel, a light-emitting diode (LED) display panel, a quantum dots (QDs) display panel, an electrophoretic display panel or other appropriate display panel capable of displaying videos and/or images.

In one embodiment, as shown in FIG. 1B, the disclosed display panel may be an LCD panel including an array substrate 11 and a color film substrate 12 arranged opposite to the array substrate 11. The touch control driving electrode array including the plurality of touch control driving electrodes 120 may be disposed on the array substrate 11, the touch control sensing electrode array and the force sensing electrodes array including the plurality of force sensing electrodes 140 may be disposed on a side of the color film substrate 12 far away from the array substrate 11, for example, on an upper surface of the color film substrate 12. That is, the display panel may be a hybrid-in-cell touch control display panel.

In addition, referring to FIG. 1A and FIG. 1B, a plurality of driving lines (i.e., scanning lines) and a plurality of data lines (not drawn in FIG. 1A and FIG. 1B) may be disposed on the array substrate 11. The data lines may extend in the first direction D1 and be arranged in the second direction D2, and the driving lines may extend in the second direction D2 and be arranged in the first direction D1.

When the disclosed display panel is an LCD panel, the LCD panel may also include any appropriate components. For example, the LCD panel may also include as a liquid crystal layer (not drawn in FIG. 1B) sandwiched between the array substrate 11 and the color film substrate 12, a plurality of primary spacers 111, a plurality of secondary spacers 112, and a thin-film-transistor (TFT) array. The primary spacers 111 and the secondary spacers 112 may be formed on the color film substrate 12 and may be extending towards the array substrate 11, and the TFT array may be formed on the array substrate 11. The well-known components in the LCD panel will not be further explained here.

Figure 2A:
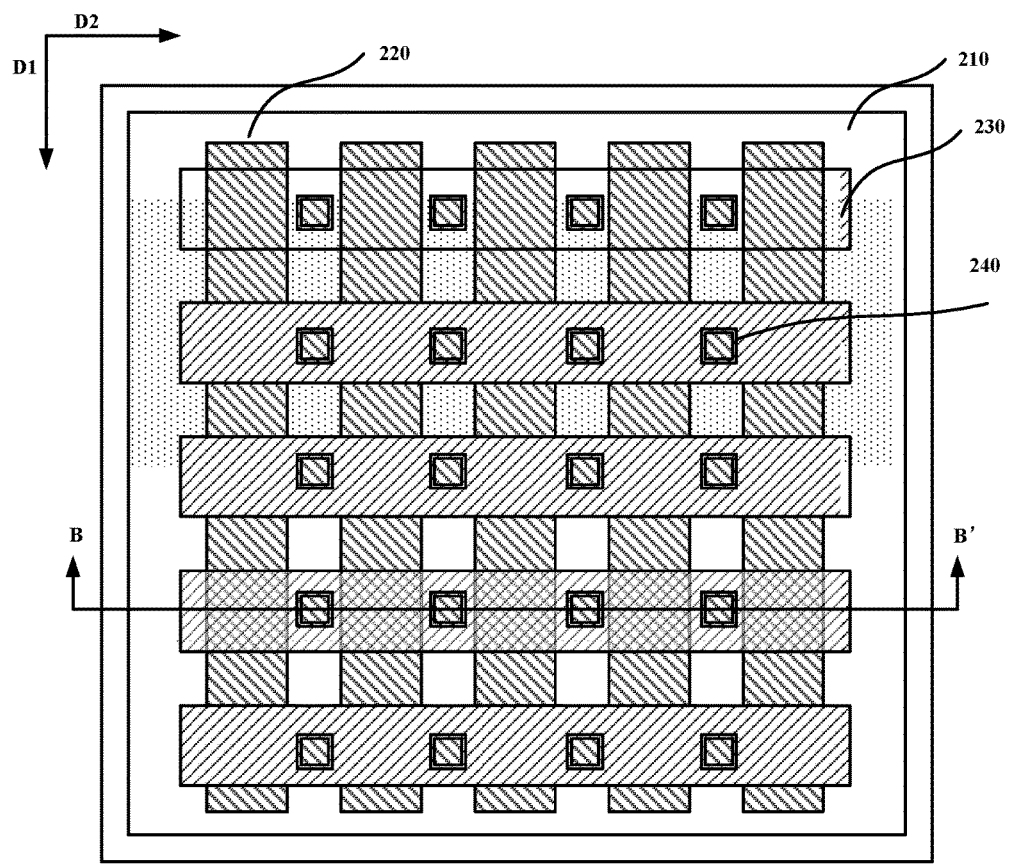
FIG. 2A illustrates another exemplary arrangement of touch control driving electrodes, touch control sensing electrodes, force sensing electrodes, and force sensing reference electrodes in an exemplary display panel consistent with disclosed embodiments.
Figure 2B:
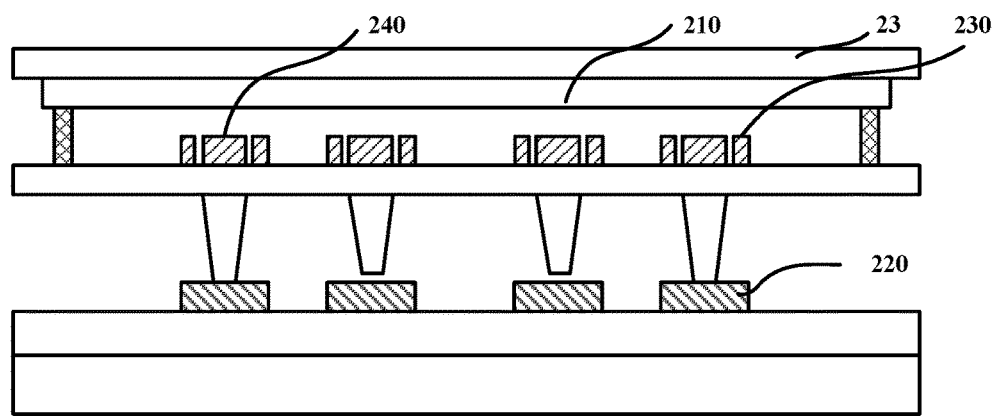
FIG. 2B illustrates a B-B' sectional view of an exemplary display panel in FIG. 2A consistent with disclosed embodiments.

FIG. 2A illustrates another exemplary arrangement of touch control driving electrodes, touch control sensing electrodes, force sensing electrodes, and force sensing reference electrodes in an exemplary display panel consistent with disclosed embodiments. FIG. 2B illustrates a B-B' sectional view of an exemplary display panel in FIG. 2A consistent with disclosed embodiments. The similarities between FIGS. 1A-1B and FIGS. 2A-2B are not repeated here, while certain differences may be explained.

Similar to the display panel in FIGS. 1A-1B, the display panel in FIGS. 2A-2B may include a touch control driving electrode array including a plurality of touch control driving electrodes 220, a touch control sensing electrode array including a plurality of touch control sensing electrodes 230, a force sensing electrode array including a plurality of force sensing electrodes 240, and at least one force sensing reference electrode 210. Other components may also be included.

In particular, the plurality of touch control driving electrodes 220 may extend in the first direction D1 and arranged in the second direction D2. The plurality of touch control sensing electrodes 230 may extend in the second direction D2 and may be arranged in the first direction D1. An orthogonal projection of each touch control sensing electrode 230 onto the touch control driving electrode array may be at least partially overlapped with each touch control driving electrode 220. The force sensing electrode array and the touch control sensing electrode array may be disposed in a same layer. The plurality of force sensing electrodes 240 may be electrically insulated from the touch control sensing electrodes 230. An orthogonal projection of the force sensing reference electrode 210 onto the force sensing electrode array may be at least partially overlapped with each force sensing electrode 240.

However, different from the display panel in FIGS. 1A-1B, the display panel in FIGS. 2A-2B may include a plurality of hollow areas formed in each touch control sensing electrode 230, and each force sensing electrode 240 may be disposed into a hollow area. In the first direction D1, the width of the touch control sensing electrode 230 may be substantially larger than the gap between two adjacent touch control sensing electrodes 230. Thus, through disposing the force sensing electrode 240 into the hollow area of the touch control sensing electrode 230, the force sensing electrode 240 in FIGS. 2A-2B may exhibit a larger area than the force sensing electrode 140 in FIGS. 1A-1B. Accordingly, the capacitance formed for detecting the touch force may be larger, the detected force signal may have a larger signal-to-noise ratio, and the accuracy of force detection may be improved.

Figure 3A:
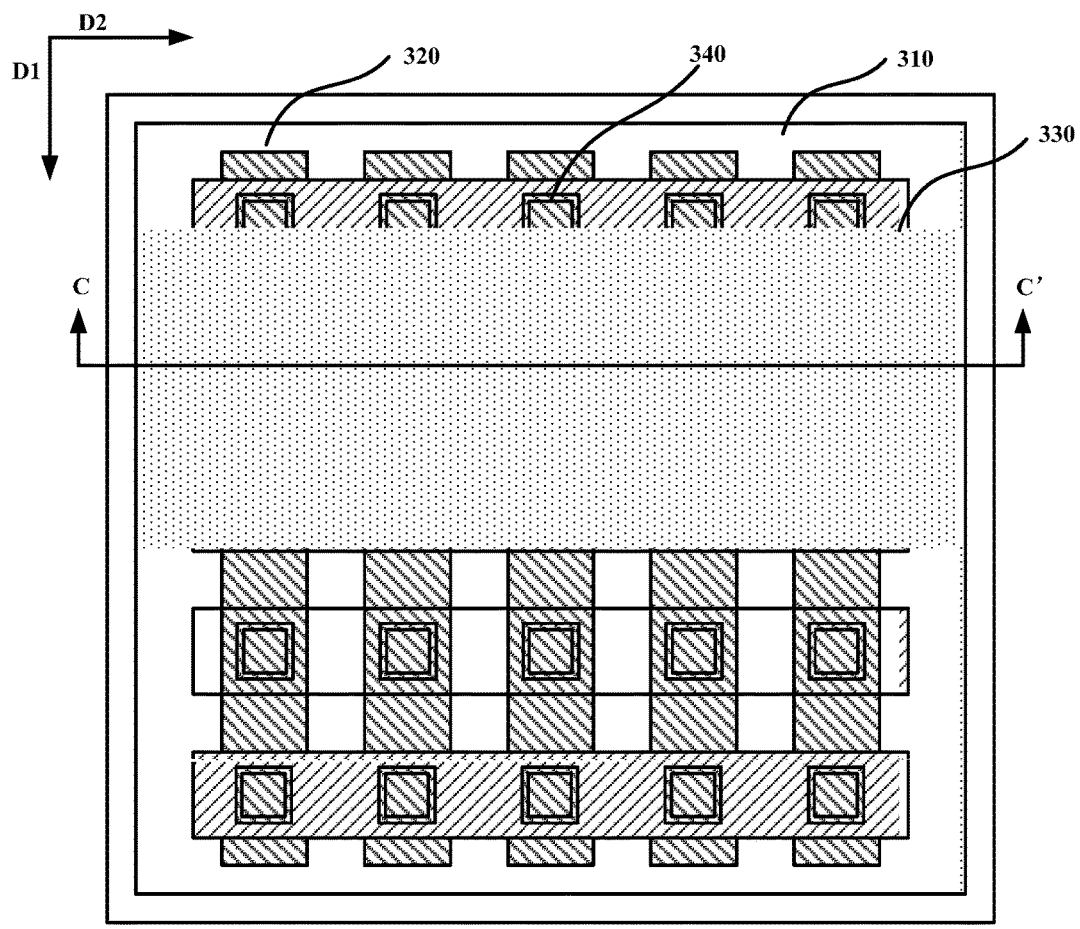
FIG. 3A illustrates another exemplary arrangement of touch control driving electrodes, touch control sensing electrodes, force sensing electrodes, and force sensing reference electrodes in an exemplary display panel consistent with disclosed embodiments.
Figure 3B:
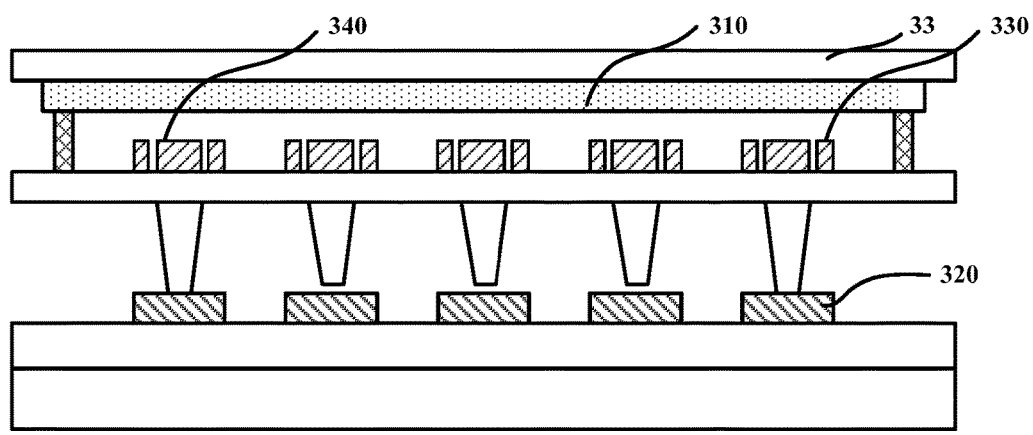
FIG. 3B illustrates a C-C' sectional view of an exemplary display panel in FIG. 3A consistent with disclosed embodiments.

FIG. 3A illustrates another exemplary arrangement of touch control driving electrodes, touch control sensing electrodes, force sensing electrodes, and force sensing reference electrodes in an exemplary display panel consistent with disclosed embodiments. FIG. 3B illustrates a C-C' sectional view of an exemplary display panel in FIG. 3A consistent with disclosed embodiments. The similarities between FIGS. 1A-1B and FIGS. 3A-3B are not repeated here, while certain differences may be explained.

Similar to the display panel in FIGS. 1A-1B, the display panel in FIGS. 3A-3B may include a touch control driving electrode array including a plurality of touch control driving electrodes 320, a touch control sensing electrode array including a plurality of touch control sensing electrodes 330, a force sensing electrode array including a plurality of force sensing electrodes 340, and at least one force sensing reference electrode 310. Other components may also be included.

In particular, the plurality of touch control driving electrodes 320 may extend in a first direction D1 and may be arranged in a second direction D2. The plurality of touch control sensing electrodes 330 may extend in the second direction D2 and may be arranged in the first direction D1. An orthogonal projection of each touch control sensing electrode 330 onto the touch control driving electrode array may be at least partially overlapped with each touch control driving electrode 320. The force sensing electrode array and the touch control sensing electrode array may be disposed in a same layer. The plurality of force sensing electrodes 340 may be electrically insulated from the touch control sensing electrodes 330. An orthogonal projection of the force sensing reference electrode 310 onto the force sensing electrode array may be at least partially overlapped with each force sensing electrode 340.

Further, similar to the display panel in FIGS. 2A-2B, the display panel in FIGS. 3A-3B may also include a plurality of hollow areas formed in each touch control sensing electrode 330, and each force sensing electrode 340 may be disposed into the hollow area. In the first direction D1, the width of the touch control sensing electrode 330 may be larger than the gap between two adjacent touch control sensing electrode 330. Thus, through disposing the force sensing electrode 340 into the hollow area of the touch control sensing electrode 330, the force sensing electrode 340 in FIGS. 3A-3B may exhibit a larger area than the force sensing electrode 140 in FIGS. 1A-1B. Accordingly, the capacitance formed for detecting the touch force may be larger, the detected force signal may have a larger signal-to-noise ratio, and the accuracy of force detection may be improved.

Different from the display panel in FIGS. 2A-2B, in the display panel in FIGS. 3A-3B, when being projected to the touch control driving electrode array, an orthogonal projection of the intersection area between the touch control driving electrode 320 and the touch control sensing electrode 330 may cover an orthogonal projection of the force sensing electrode 340. That is, the hollow area for disposing the force sensing electrode 340 may be provided within the intersection area between the touch control driving electrode 320 and the touch control sensing electrode 330.

However, the hollow areas formed in each touch control sensing electrode 330 may reduce the capacitance formed between the touch control driving electrode 320 and the touch control sensing electrode 330, i.e., the capacitance for detecting the touch position. Thus, the accuracy of the touch position detection may be reduced. To suppress such an effect on the accuracy of the touch position detection, the force sensing electrode 340 may be multiplexed as the touch control sensing electrode 330 in a touch detection stage, such that the accuracy of touch position detection may not be affected by the hollow areas formed in the touch control sensing electrode 330.

The disclosed display panel may include M number of touch control driving electrodes, N number of touch control sensing electrodes, and R1 number of force sensing electrodes, where M, N, and R1 are positive integers, respectively. M, N, and R1 may be configured to satisfy a certain relationship, such that a desired accuracy of the touch force detection may be obtained while the accuracy of the touch position detection may not be affected.

In one embodiment, M, N, and R1 may be configured to satisfy the following relationship:

$$\frac{1}{40} \times M \times N \leq R1 \leq \frac{1}{10} \times M \times N \quad (1)$$

Thus, a desired accuracy of the touch force detection may be obtained while the accuracy of the touch position detection may not be affected. That is, a desired accuracy of the touch force detection and a desired accuracy of the touch position detection may be obtained at the same time.

After the relationship among M, N, and R1 is determined, the value of M, N, and R1 may be further determined according to various application scenarios. For example, when M, N, and R1 are configured to satisfy the relationship in Equation 1, the number R1 of the force sensing electrodes in the display panel may be set as 20 to 120.

Further, an area confined by each touch control sensing electrode, i.e., a confined area of each touch control sensing electrode, may include R2 number of force sensing electrodes, where R2 is a positive integer. R2 may also be determined according to various application scenarios, such that a desired accuracy of the touch force detection may be obtained while the accuracy of the touch position detection may not be affected.

In one embodiment, R2 may be configured to be R2≤⅓× M. Given such a number R2 of force sensing electrodes disposed in the confined area of each touch control sensing electrode, a desired accuracy of the touch force detection may be obtained, while the accuracy of the touch position detection may not be reduced by the hollow areas formed in each touch control sensing electrode.

In certain embodiments, when the force sensing electrodes are embedded into the hollow areas of the touch control sensing electrodes, the number of the force sensing electrodes disposed within the confined area of each touch control sensing electrode may be the same or may be different. Further, even the number of the force sensing electrodes disposed within the confined area of each touch control sensing electrode is the same, the arrangement of the force sensing electrodes within the confined area of each touch control sensing electrode may be the same or may be different.

It should be noted that, as shown in FIG. 1A, FIG. 2A, and FIG. 3A, the first direction D1 may be a vertical direction, and the second direction D2 may be a horizontal direction. The first direction D1 may be perpendicular to the second direction D2. The first direction D1 and the second direction D2 in FIG. 1A, FIG. 2A, and FIG. 3A are for illustrative purposes and are not intended to limit the scope of the present disclosure. In certain embodiment, the first direction D1 may be not perpendicular to the second direction D2.

As shown in FIG. 1B, the touch control driving electrode array including the plurality of touch control driving electrodes 120 may be disposed on the array substrate 11, the touch control sensing electrode array and the force sensing electrodes array including the plurality of force sensing electrodes 140 may be disposed on a side of the color film substrate 12 far away from the array substrate 11, which is for illustrative purposes and are not intended to limit the scope of the present disclosure. In practical applications, the position of the touch control driving electrode array, the force sensing electrodes array, and the touch control sensing electrode array may be configured according to various application scenarios.

Further, the shape of the force sensing electrodes 140, 240, and 340 respectively shown in FIG. 1A, FIG. 2A, and FIG. 3A are for illustrative purposes and are not intended to limit the scope of the present disclosure. FIG. 1A, FIG. 2A, and FIG. 3A aim to illustrate a relative position relationship between the force sensing electrodes and the touch control sensing electrodes, the force sensing electrodes and the touch control sensing electrodes, and the force sensing electrodes and the touch control sensing electrodes. Although the force sensing electrode 140, 240, and 340 shown in FIG. 1A, FIG. 2A, and FIG. 3A has a rectangular shape, the force sensing electrodes may have different shapes according to various application scenarios in practical applications.

Figure 4A:
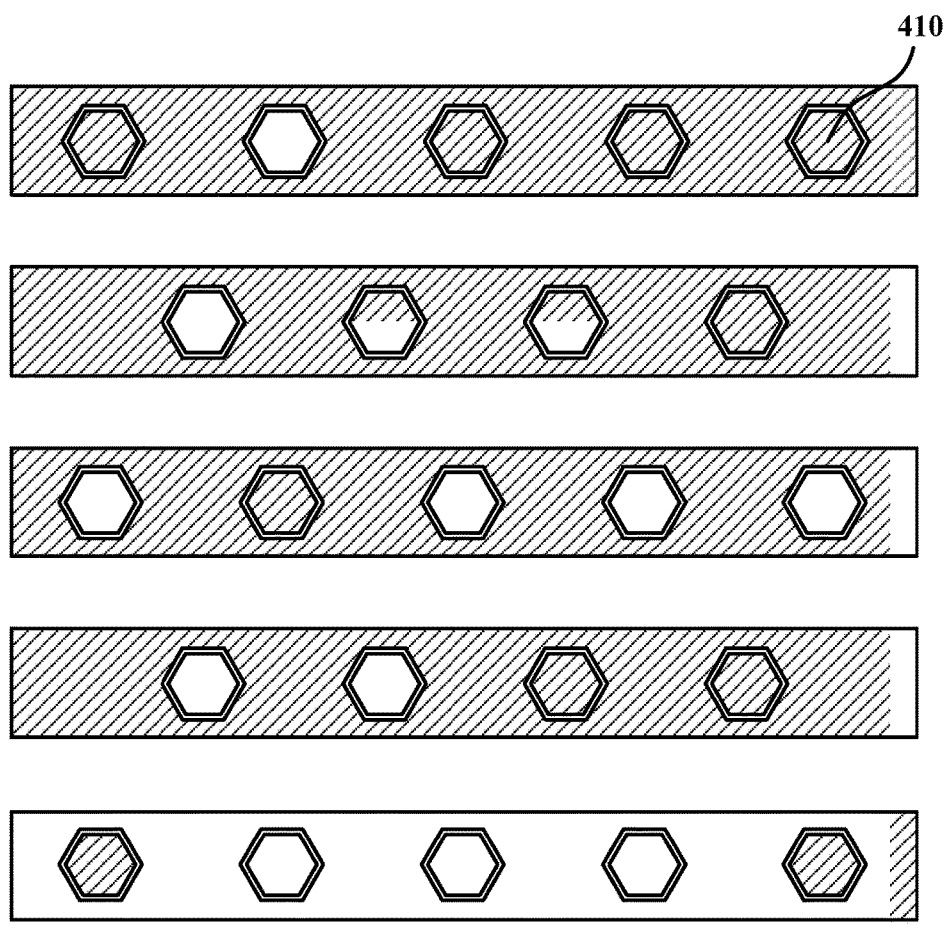
FIGS. 4A-4C illustrate top views of exemplary force sensing electrodes consistent with disclosed embodiments.
Figure 4B:
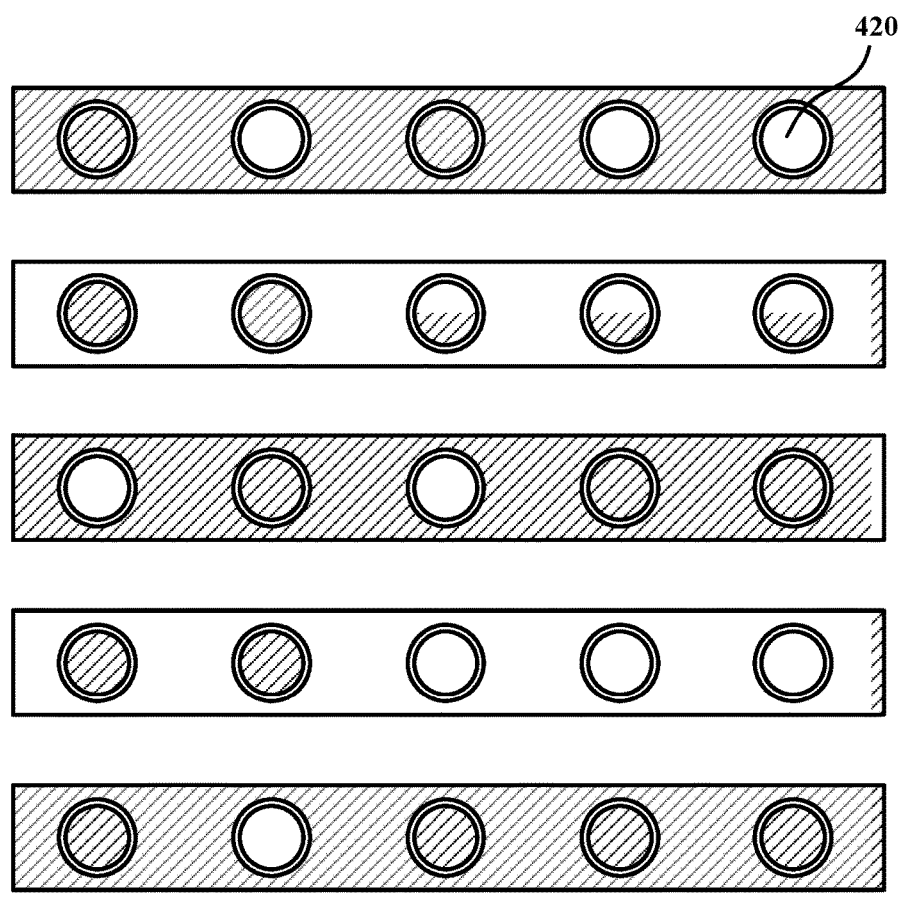
Figure 4C:
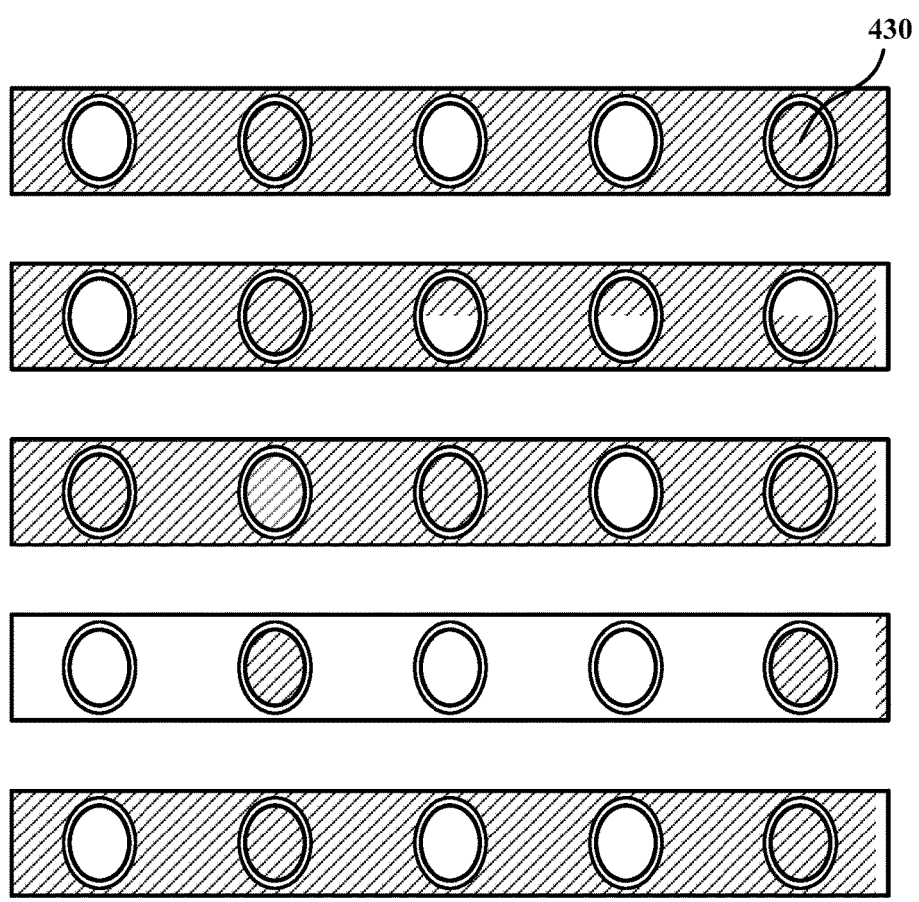

Certain examples of the force sensing electrodes are illustrated in FIGS. 4A-4C. FIGS. 4A-4C illustrate top views of exemplary force sensing electrodes consistent with disclosed embodiments. As shown in FIG. 4A, a force sensing electrode 410 may have a polygonal shape. As shown in FIG. 4B, a force sensing electrode 420 may have a circular shape. As shown in FIG. 4C, a force sensing electrode 430 may have an elliptical shape.

When the force sensing electrodes are embedded into the hollow areas of the touch control sensing electrode, the embedded positions of the force sensing electrodes in the touch control sensing electrode may be determined according to various application scenarios. For example, in one embodiment, as shown in FIG. 4A, the force sensing electrodes may be embedded into the hollow areas of the touch control sensing electrode in a "staggered" way. That is, the embedded positions of the force sensing electrodes in two adjacent touch control sensing electrodes may be staggered.

In certain embodiments, as shown in FIG. 4B and FIG. 4C, the force sensing electrodes may be embedded in the same positions in each touch control sensing electrode. That is, the embedded positions of the force sensing electrodes in two adjacent touch control sensing electrodes may be the same.

Further, as shown in FIGS. 1A-3B, the disclosed display panel may further include a cover plate 13, 23, and 33 disposed on the color film substrate, respectively. The force sensing reference electrode 110, 210, and 310 may be formed on the cover plate 13, 23, and 33, respectively. For example, the force sensing reference electrode 110, 210, and 310 may be formed on a surface of the cover plate 13, 23, and 33 facing the color film substrate, respectively. The cover plate may be made of glass, or other appropriate optical transparent materials.

As shown in FIGS. 1A-3B, the force sensing reference electrode 110, 210, and 310 may be a planar electrode, respectively. To fabricate the planar force sensing reference electrode 110, 210, and 310 on the cover plate, a transparent conductive film, such as indium tin oxide (ITO) and antimony tin oxide (ATO), may be coated on the cover plate 13, 23, and 33, respectively.

In one embodiment, the cover plate 13, 23, and 33 may be a glass plate, respectively. In another embodiment, the cover plate 13, 23, and 33 may be made of other transparent materials.

The planar shape of the force sensing reference electrode 110, 210, and 310 in FIGS. 1A-3B is for illustrative purposes and are not intended to limit the scope of the present disclosure. In practical applications, the shape of the force sensing reference electrode may vary according to various application scenarios.

Figure 5A:
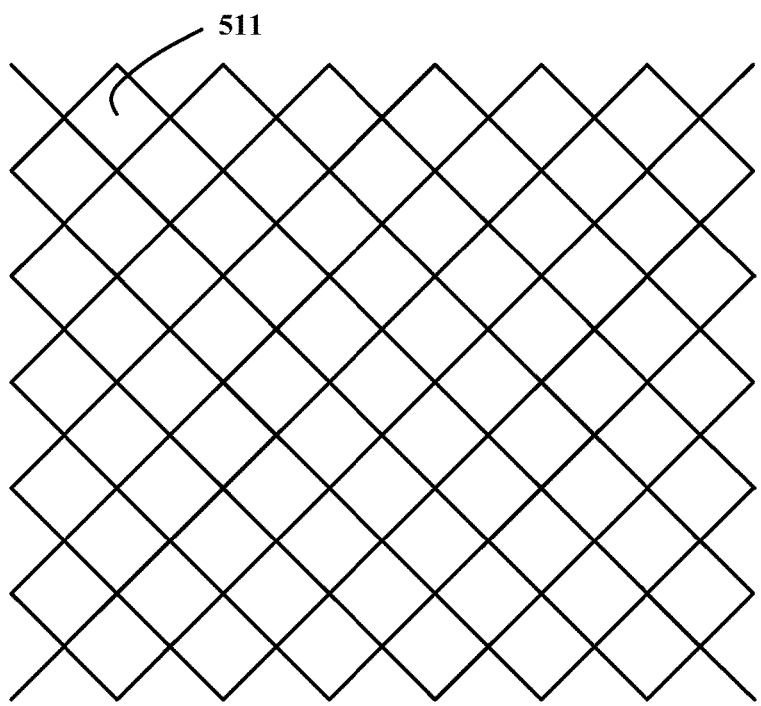
FIGS. 5A-5D illustrate top views of exemplary force sensing reference electrodes consistent with disclosed embodiments.

Certain examples of the force sensing reference electrode are illustrated in FIGS. 5A-5D. FIGS. 5A-5D illustrate top views of exemplary force sensing reference electrodes consistent with disclosed embodiments. In one embodiment, as shown in FIG. 5A, the force sensing reference electrode 510 may be a mesh electrode, and grids 511 in the mesh electrode may be electrically connected to each other. The mesh electrode 510 may be fabricated by metal wires. Because the metal wire has a substantially small resistance, the force sensing reference electrode 510 may be able to have a substantially high sensitivity.

Figure 5B:
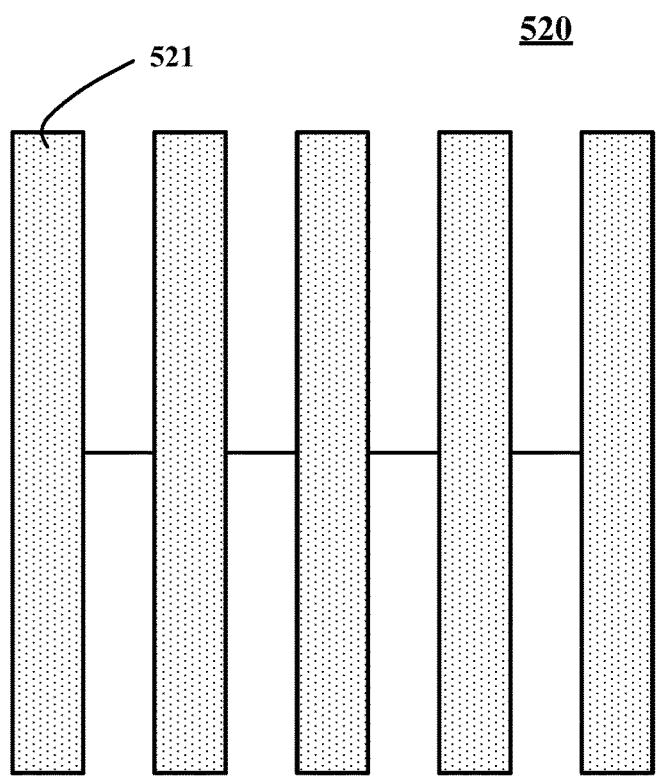

In another embodiment, as shown in FIG. 5B, the force sensing reference electrode 520 may include a plurality of stripe-shaped first sub-electrodes 521, and each first sub-electrodes 521 may be electrically connected to each other. The extending direction of the first sub-electrodes 521 may be, for example, parallel to the extending direction of the touch control sensing electrode, or parallel to the extending direction of the touch control driving electrode. A certain gap may be provided between adjacent first sub-electrodes 521, such that the touch control sensing electrodes may not be shielded by the force sensing reference electrode 520, and the sensitivity of the touch position detection may not be degraded.

Figure 5C:
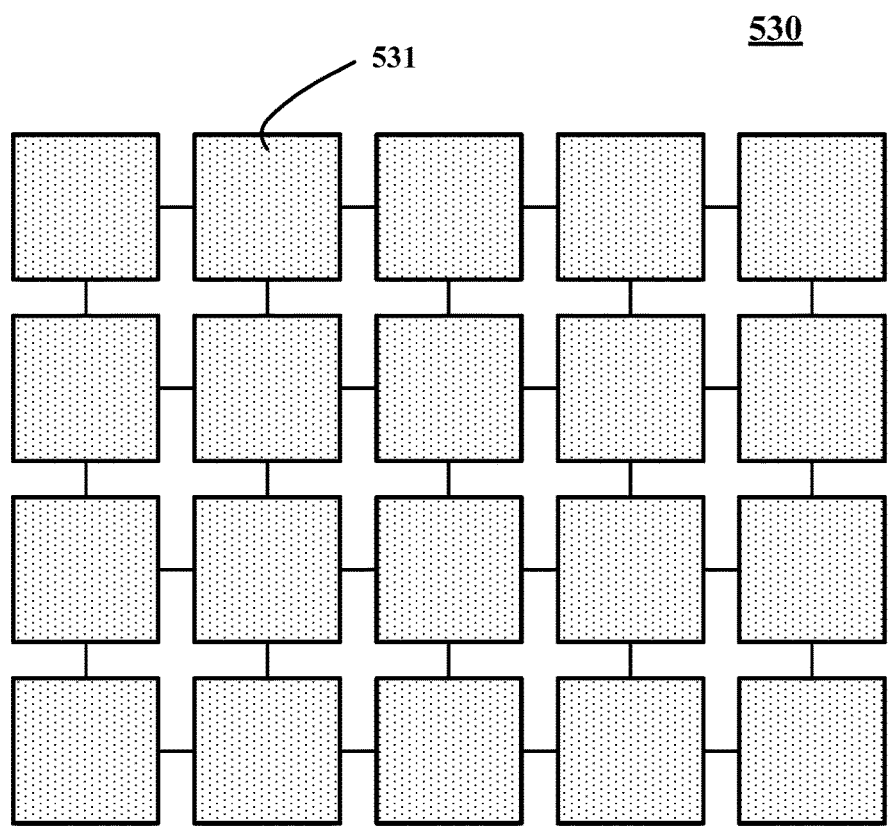

In another embodiment, as shown in FIG. 5C, the force sensing reference electrode 530 may include a plurality of second sub-electrodes 531 arranged in an array. Each second sub-electrodes 531 may be a pad electrode, and the second sub-electrodes 531 may be electrically connected to each other.

Figure 5D:
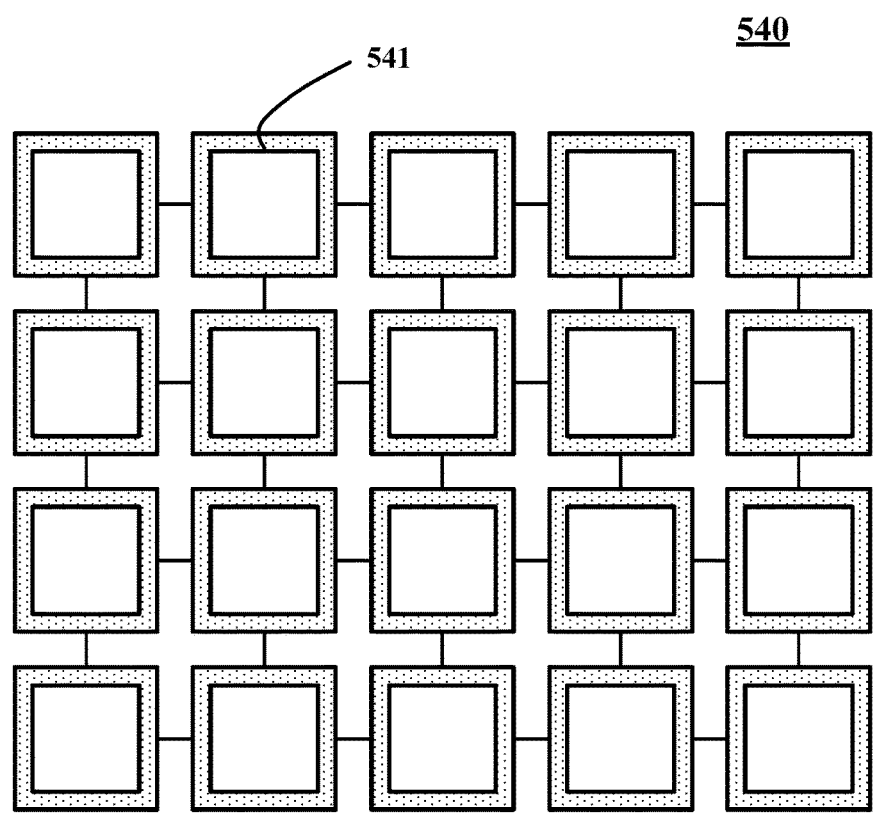

In another embodiment, as shown in FIG. 5D, the force sensing reference electrode 540 may include a plurality of second sub-electrodes 541 arranged in an array. Each second sub-electrodes 541 may be an annular electrode, and the second sub-electrodes 541 may be electrically connected to each other.

It should be noted that, in FIGS. 5B-5D, the connectors connecting each sub-electrode may be disposed in a same layer as the force sensing reference electrode. In certain other embodiments, the connectors connecting each sub-electrode may be disposed in a layer different from the force sensing reference electrode. When the connectors connecting each sub-electrode are disposed in a layer different from the sub-electrodes, the connectors may be electrically connected to the sub-electrodes through various ways. For example, the connectors may be in a direct contact with the sub-electrodes, or in contact with the sub-electrodes, e.g., via a through-hole disposed in an insulating layer between the conductive layer having the connectors and the conductive layer having the force sensing reference electrode, such that the sub-electrodes may be electrically connected to each other.

Figure 6:
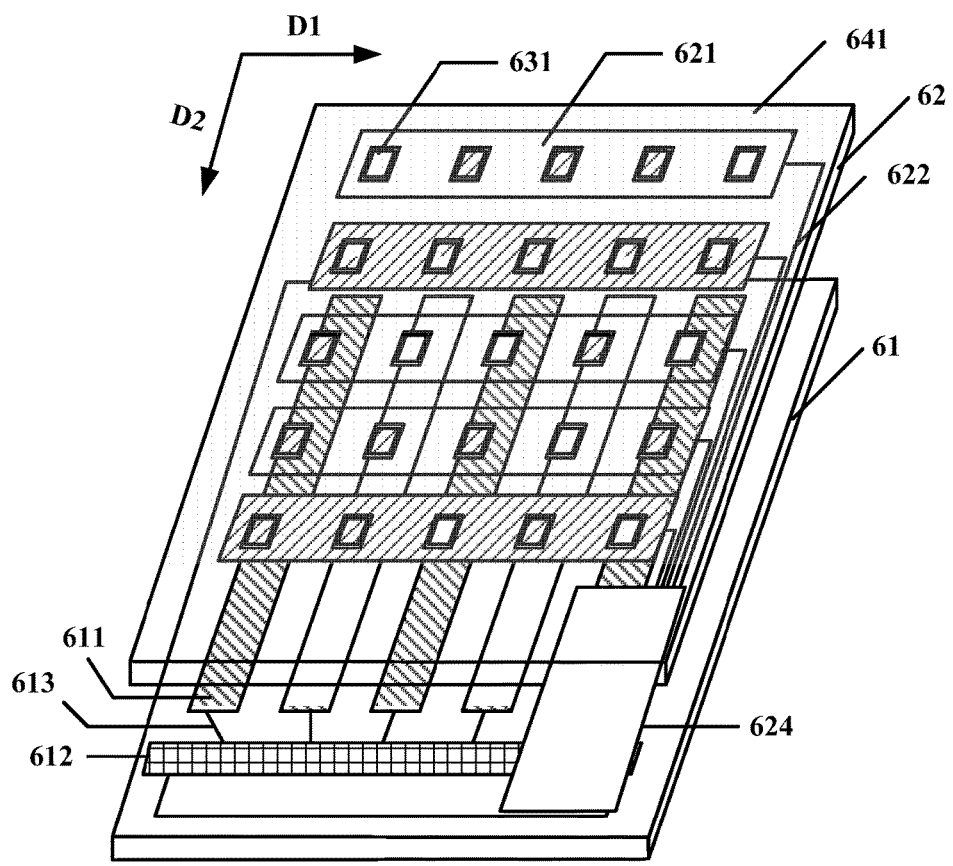
FIG. 6 illustrates an exemplary display panel consistent with disclosed embodiments.

FIG. 6 illustrates an exemplary touch control display panel consistent with disclosed embodiments. As shown in FIG. 6, the display panel may include a touch control driving electrode array including a plurality of touch control driving electrodes 611, a touch control sensing electrode array including a plurality of touch control sensing electrodes 621, a force sensing electrode array including a plurality of force sensing electrodes 631, and at least one force sensing reference electrode 641. The touch control driving electrode array is disposed on an array substrate 61. The touch control sensing electrode array and the force sensing electrode array are disposed on a color film substrate 62. Other components may also be included.

In particular, the plurality of touch control driving electrodes 611 may be extending in the first direction D1 and arranged in the second direction D2. The plurality of touch control sensing electrodes 621 may be extending in the second direction D2 and arranged in the first direction D1. The force sensing electrode array and the touch control sensing electrode array may be disposed in a same layer. The touch control driving electrodes 611, the touch control sensing electrodes 621, the force sensing electrodes 631, and the force sensing reference electrode 641 may have any disclosed shapes and any disclosed arrangements.

To provide a corresponding detecting signal to the touch control driving electrodes 611, the touch control sensing electrodes 621, the force sensing electrodes 631, and the force sensing reference electrode 641 and/or receive a corresponding sensing signal, the display panel may also include a first integrated circuit 612, a plurality of touch control driving signal lines 613, a plurality of touch control sensing signal lines 622, and a plurality of force sensing signal lines (not drawn in FIG. 6). The first integrated circuit 612 may be an appropriate controlling circuit and/or a driving circuit of the touch control display panel.

In particular, the touch control driving signal line 613 may interconnect the first integrated circuit 612 and the touch control driving electrode 611, the touch control sensing signal line 622 may interconnect the first integrated circuit 612 and the touch control sensing electrode 621, and the force sensing signal line may interconnect the first integrated circuit 612 and the force sensing electrode 631.

In a touch detection stage, i.e., a stage for detecting the touch positions, the first integrated circuit 612 may provide a touch control driving signal to the touch control driving electrodes 611 through the corresponding touch control driving signal line 613 and, meanwhile, receive a touch control sensing signal from the touch control sensing electrode 621 through the corresponding touch control sensing signal line 622. When the force sensing electrodes 631 are embedded into the hollow areas of the touch control sensing electrodes 621, each force sensing electrode 631 may be multiplexed as the touch control sensing electrodes. Then in the touch detection stage, the first integrated circuit 612 may also receive a touch control sensing signal from each force sensing electrode 631 through the corresponding force sensing signal line.

In a force detection stage, i.e., a stage for detecting the touch force, the first integrated circuit 612 may provide a force driving signal to the force sensing electrode 631 through the corresponding force sensing signal line and, meanwhile, receive a force sensing signal from the force sensing electrodes 631. In the force detection stage, the first integrated circuit 612 may also provide a force reference signal to the force sensing reference electrode 641.

In one embodiment, in a display stage, i.e., a stage for displaying images, the touch control driving electrode 611 may be multiplexed as a common electrode, for example, through a time-divisional driving method. Then the first integrated circuit 612 may also provide a common voltage signal to the touch control driving electrode 611 through the corresponding touch control driving signal line 613.

In certain embodiments, the first integrated circuit 612 and the touch control driving electrode may be disposed on an array substrate 61, and the touch control sensing electrode array and the force sensing electrode array may be disposed on a color film substrate 62. The force sensing reference electrode may be disposed on a cover plate on the top surface of the color film substrate 62. The electrical connection between the touch control sensing electrodes 621 and the first integrated circuit 612, the electrical connection between the force sensing electrodes 631 and the first integrated circuit 612, and the electrical connection between the force sensing reference electrode 641 and the first integrated circuit 612, may be realized through a first flexible printed circuit board 624.

Figure 7:
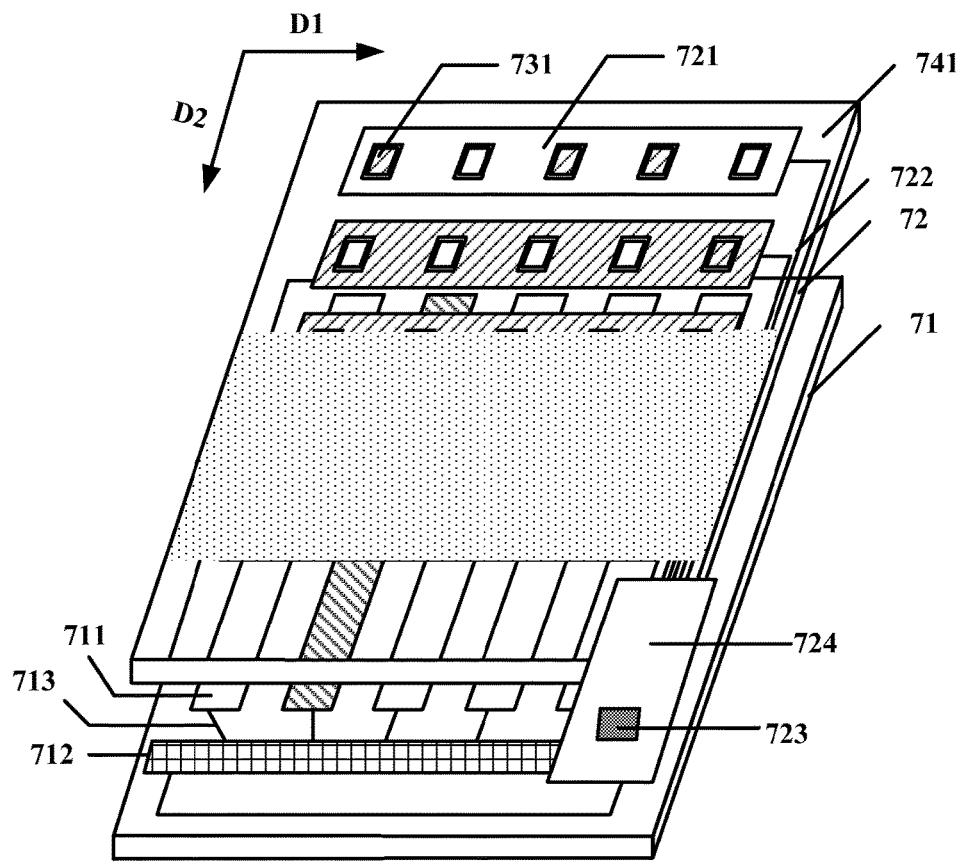
FIG. 7 illustrates another exemplary display panel consistent with disclosed embodiments.

FIG. 7 illustrates another exemplary touch control display panel consistent with disclosed embodiments. The similarities between FIG. 6 and FIG. 7 are not repeated here, while certain differences may be explained.

Similar to the display in FIG. 6, the display panel in FIG. 7 may include a touch control driving electrode array including a plurality of touch control driving electrodes 711, a touch control sensing electrode array including a plurality of touch control sensing electrodes 721, a force sensing electrode array including a plurality of force sensing electrodes 731, and at least one force sensing reference electrode 741. The touch control driving electrode array is disposed on an array substrate 71. The touch control sensing electrode array and the force sensing electrode array are disposed on a color film substrate 72. In particular, the plurality of touch control driving electrodes 711 may be extending in the first direction D1 and arranged in the second direction D2. The plurality of touch control sensing electrodes 721 may be extending in the second direction D2 and arranged in the first direction D1.

The force sensing electrode array and the touch control sensing electrode array may be disposed in a same layer. The touch control driving electrodes 711, the touch control sensing electrodes 721, the force sensing electrodes 731, and the force sensing reference electrode 741 may have any disclosed shapes and any disclosed arrangements.

Different from the display panel in FIG. 6, the display panel in FIG. 7 may include two integrated circuits: a first integrated circuit 712 and a second integrated circuit 723. The touch control driving electrode 711 may be electrically connected to the first integrated circuit 712 through a corresponding touch control driving signal line 713. The touch control sensing electrode 721 may be electrically connected to the second integrated circuit 723 through a corresponding touch control sensing signal line 722. The force sensing electrode 731 may be electrically connected to the second integrated circuit 723 through a corresponding force sensing signal line (not drawn in FIG. 7).

Thus, in the touch detection stage, the first integrated circuit 712 may provide a touch control driving signal to the touch control driving electrode 711, while the second integrated circuit 723 may receive a touch control sensing signal from the touch control sensing electrode 721. In the force detection stage, the second integrated circuit 723 may provide a force driving signal to the force sensing electrode 731 and, meanwhile, receive a force sensing signal from the force sensing electrode 731.

In certain embodiments, when the force sensing electrodes 731 are embedded into the hollow areas of each touch control sensing electrode 721, each force sensing electrode 731 may be multiplexed as the touch control sensing electrode. Then in the touch detection stage, the second integrated circuit 723 may also receive a touch control sensing signal from the force sensing electrodes 731 through the force sensing signal line.

Further, in the display stage, the touch control driving electrodes 711 may be multiplexed as a common electrode, for example, through a time-divisional driving method. Then the first integrated circuit 712 may also provide the common voltage signal to the touch control driving electrode 711.

It should be noted that, FIG. 7 illustrates that the second integrated circuit 723 may be disposed on a flexible circuit board 724, which is for illustrative purposes and is not intended to limit the scope of the present disclosure. In certain embodiments, the second integrated circuit may be disposed on the array substrate or the color film substrate, and the touch control sensing signals and the force sensing signals may be transmitted to the first integrated circuit through the second integrated circuit and the flexible printed circuit board.

Further, as shown in FIG. 7, the touch control driving signals may also be transmitted to the first integrated circuit 712 through the flexible printed circuit board 724.

Referring to FIG. 6 and FIG. 7, in the force detection stage, the force sensing reference electrode 641 and 741 may have to receive a force sensing reference signal provided by the first integrated circuit 612 and 712. In one embodiment, the electrical connection between the force sensing reference electrode 641 and 741 and the first integrated circuit 612 and 712 may be realized through the first flexible printed circuit board 624 and 724. Thus, in the force detection stage, the force sensing reference electrode 641 and 741 may be able to receive a force sensing reference signal provided by the first integrated circuit 612 and 712.

Figure 8:
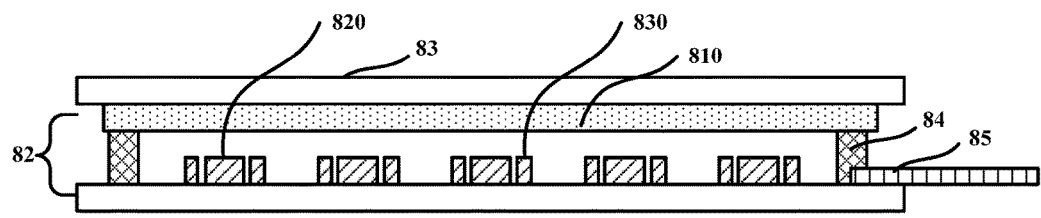
FIG. 8 illustrates an exemplary electrical connection between an exemplary force sensing reference electrode and an exemplary first flexible printed circuit consistent with disclosed embodiments.
Figure 9:
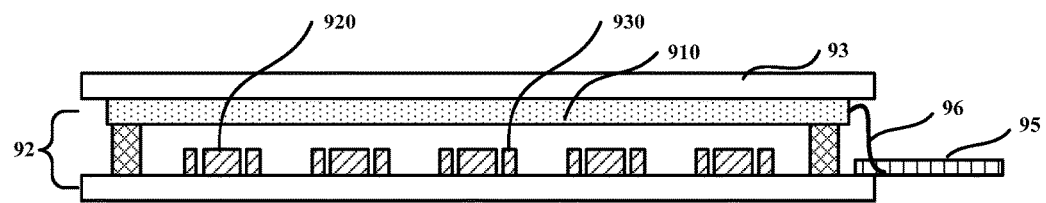
FIG. 9 illustrates another exemplary electrical connection between an exemplary force sensing reference electrode and an exemplary first flexible printed circuit consistent with disclosed embodiments.

Certain examples of realizing the electrical connection between the force sensing reference electrode and the first integrated circuit are illustrated in FIG. 8 and FIG. 9.

FIG. 8 illustrates an exemplary electrical connection between an exemplary force sensing reference electrode and an exemplary first flexible printed circuit consistent with disclosed embodiments. As shown in FIG. 8, the force sensing reference electrode 810 may be formed on a cover plate 83. A plurality of force sensing electrodes 820 and a plurality of touch control sensing electrodes 830 may be formed on a color film substrate 82. The cover plate 83 and the color film substrate 82 may be in contact with each other through an adhesive member 84.

The adhesive member 84 may be made of optically clear adhesive (OCA) 84. The optically clear adhesive frame 84 may be in contact with the force sensing reference electrode 810 and the first flexible printed circuit 85, respectively. In particular, a plurality of conductive gold spacers (not drawn in FIG. 8) may be formed in the optically clear adhesive 84, such that the force sensing reference electrode 810 may be electrically connected to the first flexible printed circuit 85 through the conductive gold spacers.

Further, the optically clear adhesive 84 may be hard optically clear adhesive and/or soft optically clear adhesive. In one embodiment, the adhesive member 84 may be an optically clear adhesive frame. In another embodiment, when being disposed in a non-display area of the display panel, non-transparent materials may be used as the adhesive member 84 to attach the cover plate 83 to the color film substrate 82.

FIG. 9 illustrates another exemplary electrical connection between an exemplary force sensing reference electrode and an exemplary first flexible printed circuit consistent with disclosed embodiments. The similarities between FIG. 8 and FIG. 9 are not repeated here, while certain differences may be explained.

As shown in FIG. 9, the force sensing reference electrode 910 may be formed on a cover plate 93. A plurality of force sensing electrodes 920 and a plurality of touch control sensing electrodes 930 may be formed on a color film substrate 92. The display panel may also include at least one force sensing signal line 96, and the force sensing reference electrode 910 may be electrically connected to the first flexible printed circuit 95 through the force sensing signal line 96.

Figure 10:
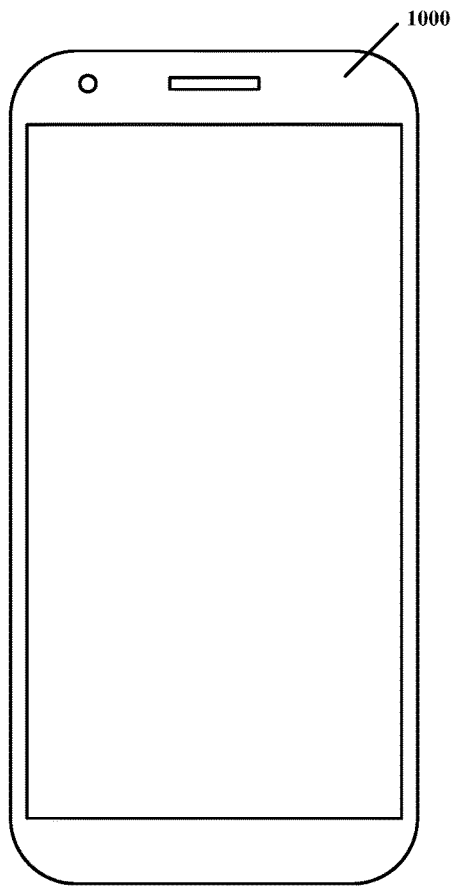
FIG. 10 illustrates an exemplary display device consistent with disclosed embodiments.

The present disclosure also provides a touch control display device. FIG. 10 illustrates an exemplary display device consistent with disclosed embodiments. As shown in FIG. 10, the display device 1000 may comprise any disclosed display panels. Those skilled in the art should understand that, in addition to the disclosed display panel, the display device 1000 may also include any appropriate components, such as a backlight unit providing a backlight source to the display panel, which are not further explained here.

Further, the display device 1000 may comprise any disclosed display panels. Although a smart phone is shown FIG. 10, the disclosed display device is not limited to the smart phone. The disclosed display device may also be a tablet, a monitor, a screen in smart wearable display devices, and a display device, etc. Any display device including the disclosed display panels will fall within the scope of the present disclosure.

Figure 11:
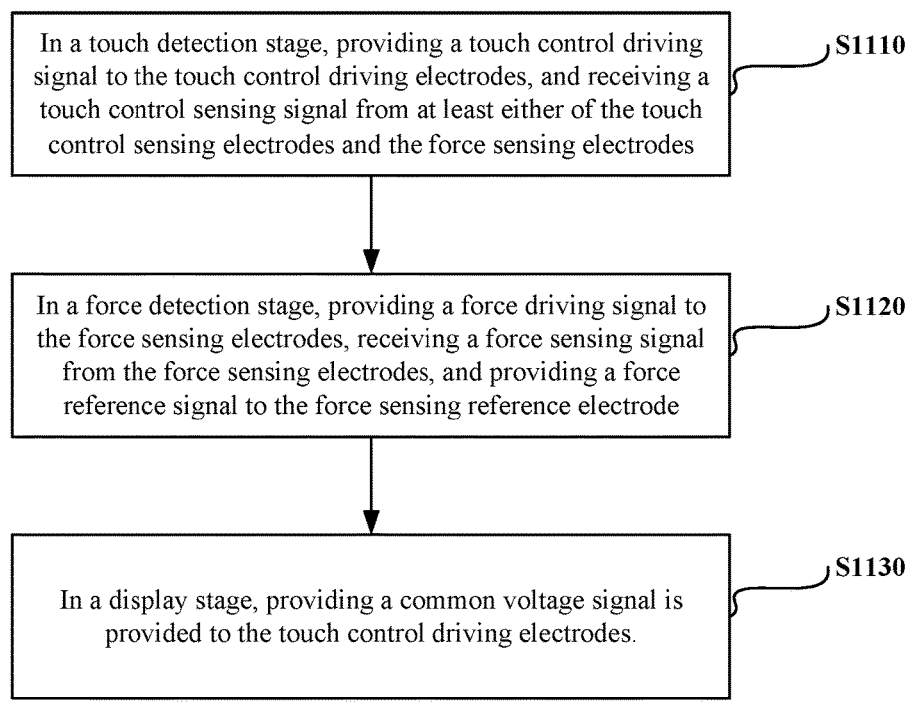
FIG. 11 illustrates a flow chart of an exemplary driving method consistent with disclosed embodiments.
Figure 12:
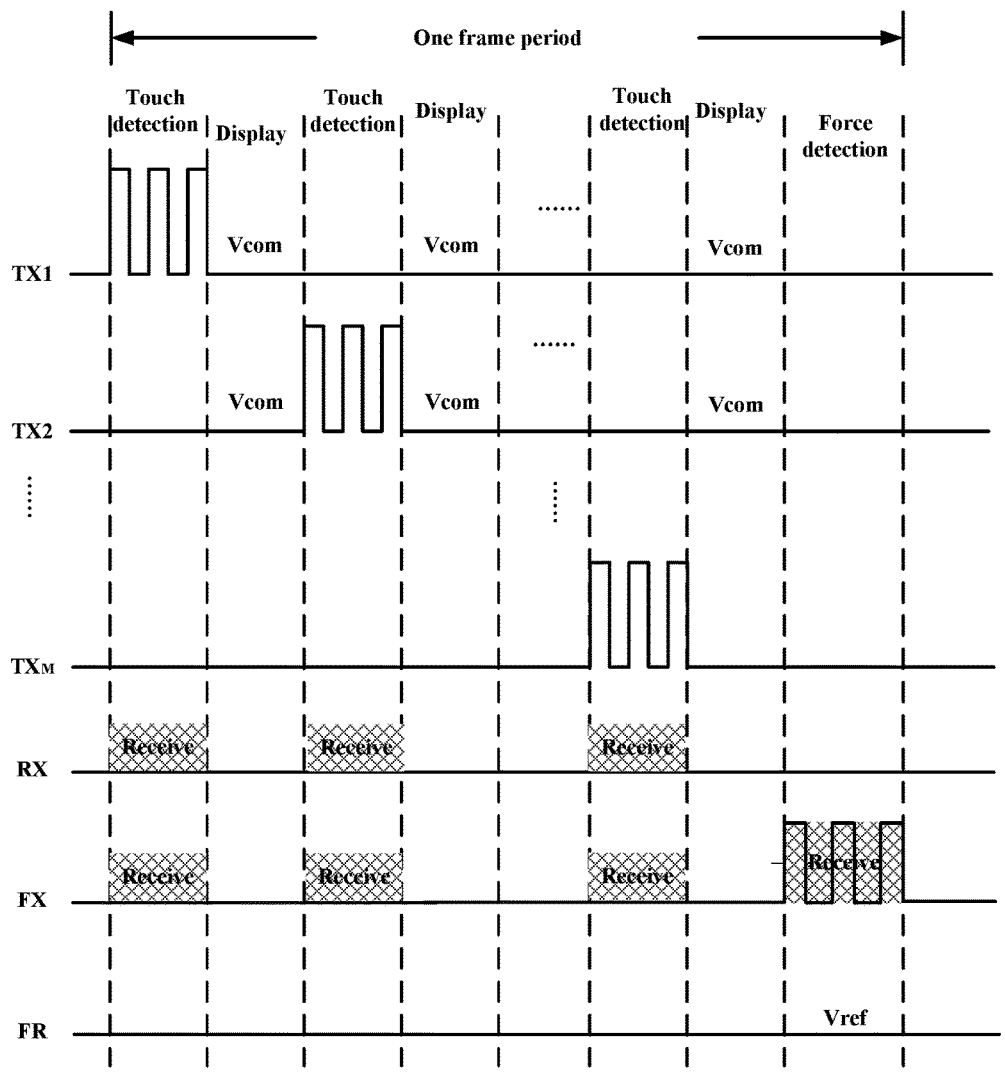
FIG. 12 illustrates an exemplary driving scheme of an exemplary driving method consistent with disclosed embodiments.

The present disclosure also provides a driving method for the disclosed touch control display panel. The driving method may be applied to any disclosed touch control display panels. FIG. 11 illustrates a flow chart of an exemplary driving method consistent with disclosed embodiments. FIG. 12 illustrates an exemplary driving scheme of an exemplary driving method consistent with disclosed embodiments.

As shown in FIG. 11, in a touch detection stage, a touch control driving signal is provided to a plurality of touch control driving electrodes, and touch control sensing signals are received from touch control sensing electrodes and/or force sensing electrodes (S1110).

Referring to FIG. 12, one frame period may include a touch detection stage, a display stage, and a force detection stage. The one frame period may be a period in which a certain number of screens are displayed. The number of the screens included in one frame period may be one, two, three, and etc. In the touch detection stage, a touch control driving signal may be provided to a plurality of touch control driving electrodes $TX_1 \sim TX_M$, and touch control sensing signals may be received from touch control sensing electrodes RX and/or force sensing electrodes FX.

In one embodiment, the touch detection stage in one frame period may include a plurality of touch detection sub-stages. In each touch detection sub-stage, the touch control driving signal may be sent to one touch control driving electrode. For example, the display panel including M number of touch control driving electrodes and, accordingly, the touch detection stage in one frame period may include M number of touch detection sub-stages. In the i-th touch detection sub-stage, the touch control driving signal may be sent to the i-th touch control driving electrode, where i is a positive integer, and $1 \leq i \leq M$.

In another embodiment, the touch detection stage in one frame period may include k number of touch detection sub-stages. In the j-th touch detection sub-stage, different touch control driving signals may be respectively sent to k number of touch control driving electrodes, where k and j are a positive integer, respectively, and $1 \leq k \leq M$, $$\sum_{j=1}^{k} k_j = M.$$

Further, in the touch detection stage, each touch control sensing electrode RX may simultaneously collect the touch control sensing signals, and send the collected touch control sensing signals to the integrated circuit electrically connected thereto.

In certain embodiments, in the touch detection stage, when the force sensing electrodes FX are multiplexed as the touch control sensing electrodes, each force sensing electrode FX may simultaneously collect the touch control sensing signals, and send the collected touch control sensing signals to the integrated circuit electrically connected thereto.

Returning to FIG. 11, in the force detection stage, a force driving signal is provided to the force sensing electrode, a force sensing signal is received from the force sensing electrode, and a force reference signal is provided to the force sensing reference electrode (S1120).

Referring to FIG. 12, a force driving signal may be provided to the force sensing electrodes FX, a force sensing signal may be received from the force sensing electrodes FX, and a force reference signal Vref may be provided to the force sensing reference electrode FR. Thus, according to the capacitance change in the capacitor formed between the force sensing electrodes FX and the force sensing reference electrode FR, the magnitude of the force applied to the display panel may be identified, and the force touch may be realized.

Returning to FIG. 11, in the display stage, a common voltage signal is provided to the touch control driving electrodes (S1130). Referring to FIG. 12, in the display stage, a common voltage signal Vcom may be provided to the touch control driving electrodes $TX_1 \sim TX_M$.

It should be noted that, the force driving signal and the touch control driving signal may have the same or different waveforms. Moreover, the force reference signal Vref and the common voltage signal Vcom may also have the same or different waveforms. The waveforms of the force driving signal, the touch control driving, the force reference signal Vref, and the common voltage signal Vcom in FIG. 12 are for illustrative purposes and are not intended to limit the scope of the present disclosure.

Further, in the disclosed driving method, the number of the various steps (i.e., S1110-S1130) are adopted for illustrating that one frame period may include the touch detection stage, the force detection stage, and the display stage, which is not intended to limit the sequence relationship among the touch detection stage, the force detection stage, and the display stage. In practical applications, the sequence relationship among the touch detection stage, the force detection stage, and the display stage may be determined according to various applications scenarios.

In the disclosed emboldens, through disposing the force sensing reference electrode and the force sensing electrode array in the same layer as the touch control sensing electrode array, the magnitude of an external force applied onto the display panel may be detected. Moreover, because the force sensing electrode array and the touch control sensing electrode array are disposed in the same layer, the force sensing electrode array and the touch control sensing electrode array may be fabricated in the same fabrication step. Thus, the fabrication procedure of the display panel may be simplified, and the production yield may be improved. The thickness of the display panel may also be reduced, which may be in line with the development trend of thinner and lighter display panels.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display panel, comprising:
a touch control driving electrode array, disposed on an array substrate, including a plurality of touch control driving electrodes extending in a first direction and arranged in a second direction;
a touch control sensing electrode array, disposed on a color film substrate arranged opposite to the array substrate, including a plurality of touch control sensing electrodes extending in the second direction and arranged in the first direction, wherein an orthogonal projection of a touch control sensing electrode of the plurality of touch control sensing electrodes onto the touch control driving electrode array is at least partially overlapped with a touch control driving electrode of the plurality of touch control driving electrodes;
a force sensing electrode array disposed in a same layer as the touch control sensing electrode array, wherein the force sensing electrode array includes a plurality of force sensing electrodes electrically insulated from the touch control sensing electrodes;
at least one force sensing reference electrode disposed on a color plate, wherein an orthogonal projection of the at least one force sensing reference electrode onto the force sensing electrode array is at least partially overlapped with one force sensing electrodes of the plurality of force sensing electrodes;
a first flexible printed circuit; and
an optically clear adhesive attaching the cover plate to the color film substrate, wherein:
the optically clear adhesive is in contact with the at least one force sensing reference electrode and the first flexible printed circuit, respectively,
the at least one force sensing reference electrode is electrically connected to the first flexible printed circuit through a plurality of conductive gold spacers formed in the optically clear adhesive,
the color film substrate arranged opposite to the array substrate includes the touch control sensing electrode array and the force sensing electrodes array, both disposed on a side of the color film substrate far away from the array substrate, and
the cover plate is disposed on the color film substrate, wherein the force sensing reference electrode is formed on a surface of the cover plate facing the color film substrate.

2. The display panel according to claim 1, wherein:
a plurality of data lines are extending in the first direction and arranged in the second direction; and
a plurality of driving lines are extending in the second direction and arranged in the first direction.

3. The display panel according to claim 1, wherein:
a plurality of hollow areas are formed in each touch control sensing electrode; and
each force sensing electrode is embedded into a hollow area.

4. The display panel according to claim 1, wherein when being projected to the touch control driving electrode array, an orthogonal projection of an intersection area between the touch control driving electrode and the touch control sensing electrode covers an orthogonal projection of a force sensing electrode.

5. The display panel according to claim 1, wherein:
the display panel includes M number of touch control driving electrodes, N number of touch control sensing electrodes, and R1 number of force sensing electrodes, M, N, and R1 being positive integers, respectively, and $1/40 \times M \times N \leq R1 \leq 1/10 \times M \times N$.

6. The display panel according to claim 5, wherein:
the number R1 of the force sensing electrodes is 20-120; and
a confined area of each touch control sensing electrode includes R2 number of force sensing electrodes, R2 being a positive integer, and $R2 \leq 1/3 \times M$.

7. The display panel according to claim 1, wherein:
a force sensing electrode has a polygonal shape, a circular shape, or an elliptical shape.

8. The display panel according to claim 1, wherein:
the force sensing reference electrode is a mesh electrode including a plurality of grids; and
the grids are electrically connected to each other.

9. The display panel according to claim 1, wherein:
the force sensing reference electrode includes a plurality of first sub-electrodes;
a first sub-electrode is a stripe-shaped electrode; and
the first sub-electrodes are electrically connected to each other.

10. The display panel according to claim 1, wherein:
the force sensing reference electrode includes a plurality of second sub-electrodes arranged in an array;
a second sub-electrode is a pad electrode or an annular electrode; and
the second sub-electrodes are electrically connected to each other.

11. The display panel according to claim 1, further including:
a plurality of force sensing signal lines, wherein each force sensing electrode is electrically connected to the first flexible printed circuit through a force sensing signal line of the plurality of force sensing signal lines.

12. The display panel according to claim 11, further including:
at least one force reference signal line, wherein the force sensing reference electrode is electrically connected to a first integrated circuit through the at least one force reference signal line.

13. The display panel according to claim 1, further including:
a first integrated circuit for controlling the display panel; and
a plurality of touch control driving signal lines,
wherein the touch control driving electrode is electrically connected to the first integrated circuit through a touch control driving signal line,
in a display stage, each touch control driving electrode is multiplexed as a common electrode, and the first integrated circuit provides a common voltage signal to the touch control driving electrode, and
in a touch detection stage, the first integrated circuit provides a touch control driving signal to the touch control driving electrode.

14. The display panel according to claim 13, further including:
a plurality of touch control sensing signal lines,
wherein the touch control sensing electrode is electrically connected to the first integrated circuit through a touch control sensing signal line,
the first integrated circuit receives a touch control sensing signal collected by the touch control sensing electrode,
each force sensing electrode is electrically connected to the first integrated circuit through a force sensing signal line,
in a force detection stage, the first integrated circuit provides a force driving signal to the force sensing electrode through the force sensing signal line, and receives a force sensing signal collected by the force sensing electrode, and
in the touch detection stage, the force sensing electrodes are multiplexed as the touch control sensing electrodes, and the first integrated circuit receives the touch control sensing signal collected by the force sensing electrode.

15. The display panel according to claim 13, further including:
a second integrated circuit for controlling the display panel; and
a plurality of touch control sensing signal lines, wherein each touch control sensing electrode is electrically connected to the second integrated circuit through a touch control sensing signal line, the second integrated circuit receives a touch control sensing signal collected by the touch control sensing electrode, each force sensing electrode is electrically connected to the second integrated circuit through the force sensing signal line, in a force detection stage, the second integrated circuit provides a force driving signal to the force sensing electrodes, and receives a force sensing signal from the force sensing electrode, and in the touch detection stage, the force sensing electrodes are multiplexed as the touch control sensing electrodes, and the second integrated circuit receives the touch control sensing signal collected by the force sensing electrode.

16. A driving method for driving a display panel comprising a touch control driving electrode array, disposed on an array substrate, including a plurality of touch control driving electrodes extending in a first direction and arranged in a second direction; a touch control sensing electrode array, disposed on a color film substrate arranged opposite to the array substrate, including a plurality of touch control sensing electrodes extending in the second direction and arranged in the first direction, wherein an orthogonal projection of a touch control sensing electrode of the plurality of touch control sensing electrodes onto the touch control driving electrode array is at least partially overlapped with a touch control driving electrodes of the plurality of touch control driving electrodes; a force sensing electrode array disposed in a same layer as the touch control sensing electrode array, wherein the force sensing electrode array includes a plurality of force sensing electrodes electrically insulated from the touch control sensing electrodes; at least one force sensing reference electrode disposed on a color plate, wherein an orthogonal projection of the at least one force sensing reference electrode onto the force sensing electrode array is at least partially overlapped with the force sensing electrodes; a first flexible printed circuit; and an optically clear adhesive attaching the cover plate to the color film substrate, wherein the optically clear adhesive is in contact with the at least one force sensing reference electrode and the first flexible printed circuit, respectively, the at least one force sensing reference electrode is electrically connected to the first flexible printed circuit through a plurality of conductive gold spacers formed in the optically clear adhesive, the color film substrate arranged opposite to the array substrate includes the touch control sensing electrode array and the force sensing electrodes array, both disposed on a side of the color film substrate far away from the array substrate, and the cover plate is disposed on the color film substrate, wherein the force sensing reference electrode is formed on a surface of the cover plate facing the color film substrate, wherein the driving method comprises:

in a display stage, providing a common voltage signal is provided to the touch control driving electrodes.

17. The driving method according to claim 16, wherein the display panel includes M number of touch control driving electrodes, and the touch detection stage includes M number of touch detection sub-stages, wherein the driving method further includes:

in the i-th touch detection sub-stage, providing the touch control driving signal to the i-th touch control driving electrode, where M is a positive integer, i is a positive integer, and $1 \leq i \leq M$.

18. The driving method according to claim 16, wherein the display panel includes M number of touch control driving electrodes, and the touch detection stage includes k number of touch detection sub-stages, wherein the driving method further includes:

in the j-th touch detection sub-stage, providing different touch control driving signals to $k_j$ number of touch control driving electrodes, where M, k, and j are positive integers, respectively, and $1 \leq k \leq M$, $$\sum_{j=1}^{k} k_j = M.$$

* * * * *